United States Patent Office 3,407,196
Patented Oct. 22, 1968

3,407,196
BENZOXAZOLYLSTILBENES
Peter Liechti, Binningen, Erwin Maeder, Aesch, Basel, Leonardo Guglielmetti, Birsfelden, Max Duennenberger, Frenkendorf, and Adolf Emil Siegrist, Basel, Switzerland, assignors to Ciba Limited, Basel, Switzerland, a Swiss company
No Drawing. Continuation-in-part of application Ser. No. 408,756, Nov. 4, 1964. This application Sept. 1, 1967, Ser. No. 664,899
Claims priority, application Switzerland, Nov. 14, 1963, 13,986/63; May 12, 1964, 6,155/64
12 Claims. (Cl. 260—240)

ABSTRACT OF THE DISCLOSURE

The present invention concerns new bis-(benzoxazolyl-2)-4,4-stilbenes, which contain in the benzene ring of the benzoxazolyl residue a carboxyl group in free form, esterified or as nitrile group, and wherein the ethylene bridge member of the stilbene moiety is unsubstituted. These new compounds represent valuable optical brighteners, especially for aromatic polyesters and for polyamides.

Cross-references to related applications

This is a continuation-in-part of application Serial No. 408,756, filed November 4, 1964, now abandoned.

The present invention provides new, valuable bisbenzoxazolyl-stilbenes of the formula (1)
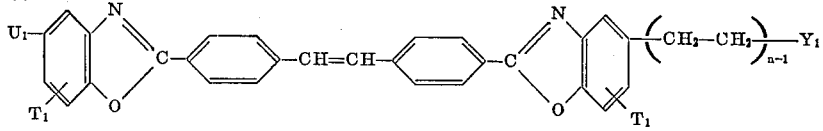

wherein
$U_1$ represents a member selected from the group consisting of hydrogen and

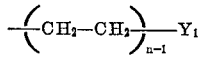

$n$ stands for the number 1 or 2,
$Y_1$ is a member selected from the group consisting of carboxyl, carbo($C_1$–$C_{18}$)-alkoxy, carbo($C_2$–$C_3$)-alkenyloxy, —COO-($C_1$–$C_4$)-alkylene—O - ($C_1$–$C_2$) - alkyl, carbophenyl($C_1$–$C_4$)-alkoxy, carbo($C_1$–$C_8$) - alkylphenoxy and a nitrile group,
and wherein
$T_1$ represents a member selected from the group consisting of hydrogen and an alkyl group of from 1 to 8 carbon atoms.

From among these new bis-benzoxazolyl-stilbenes of the Formula 1 there may be specially mentioned those of the formula (2)
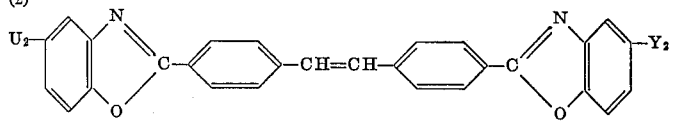

wherein $U_2$ represents a member selected from the group consisting of hydrogen and $Y_2$, and $Y_2$ is a member selected from the group of consisting of a carboxyl group, a carbalkoxy group having 1 to 18 carbon atoms in the alkoxy group, a carboxylic acid allyl ester group an a —COO-($C_1$–$C_4$)-alkylene—O—alkyl($C_1$–$C_2$) group.

Within the scope of the foregoing formulae there are of preferred interest compounds of the formula (3)
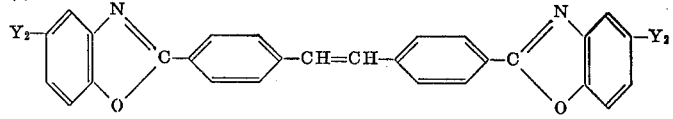

wherein $Y_2$ is a member selected from the group consisting ot a carboxyl group, a carbalkoxy group, having from 1 to 6 carbon atoms in the alkoxy group a carboxylic acid allyl ester group and a —COO-($C_1$–$C_4$)-alkylene-O-alkyl($C_1$–$C_2$) group.

The new bis-oxazolyl-stilbene compounds of the Formula 1 can be manufactured by various, for example as such known, methods.

According to one process, for example, at least one ortho-hydroxyamino compound is reacted at an elevated temperature, for example at 120° to 330° C., with or without intermediate isolation and preferably in the presence of a catalyst, in the molecular ratio of 2:1 with stilbene-4,4'-dicarboxylic acid or with a functional derivative of this dicarboxylic acid, especially an ester such as diethyl ester or an acid halide such as the acid chloride, using an ortho-hydroxyamino compound of the formulae (4)
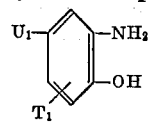

and
(5)
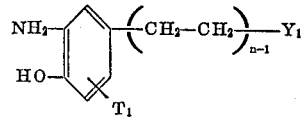

where $U_1$, $T_1$, $Y_1$ and $n$ have the meanings defined above.

The reaction of the selected components can be performed with or without intermediate isolation by heating at an elevated temperature, for example from 120° to 330° C., advantageously in an inert gas, for example nitrogen, and if necessary or desired in the presence of a catalyst. Suitable catalysts are, for example boric acid, zinc chloride, paratoluenesulfonic acid, also polyphosphoric acids including pyrophosphoric acid. When boric acid is used as catalyst, it is of advantage to use it in an amount from about 0.5 to 5% referred to the weight of the reaction mixture as a whole. There may also be used additionally high-boiling, polar, organic solvents such, for example, as dimethyl formamide, and aliphatic (optionally etherified) hydroxy compounds, for example dialkylcarbitols, propyleneglycols, ethyleneglycol monoethyl ether or diethyleneglycol diethyl ether and high-boiling esters of phthalic acid, for example phthalic acid dibutyl ester.

Alternatively, a two-stage variant may be used, wherein first 1 mol of a stilbene-4,4'-dicarboxylic acid or of a functional derivative thereof, especially 1 mol of the dicarboxylic acid dichloride, is reacted with 2 mols of the ortho-hydroxyamino compound in the presence of an organic solvent such as toluene, a xylene, chlorobenzene, dichloro-benzene or nitrobenzene, at an elevated temperature, whereupon the acyl compound obtained in this manner is converted into the bis-oxazolyl-stilbene at an elevated temperature, if required or desired in the presence of a catalyst. When the starting material to be used is a dicarboxylic acid dichloride, it can be prepared directly, prior to the condensation with the ortho-hydroxyamino compound and without isolation, from the free dicarboxylic acids and thionyl chloride in the solvent in which subsequently the condensation is carried out.

In the dissolved or finely dispersed state the new bis-oxazolyl-stilbene compounds of the composition defined above display a more or less strongly pronounced fluorescence. They may be used for optically brightening a wide variety of organic materials. Good results are obtained, for example, in brightening acryl resin lacquers, alkyd resin lacquers, cellulose ester lacquers, for example acetylcellulose lacquers or nitrocellulose lacquers. The new bis-oxazoles are particularly suitable for optically brightening synthetic fibers, for example from cellulose esters, cellulose propionate or acetylcellulose (cellulose diacetate or cellulose triacetate; acetate rayon), especially from polyamides (for example nylon) and polyesters, from polyolefines such as polyethylene, and films, foils, tapes or mouldings from these materials or from other materials, such as polystyrene, polyvinyl chloride, polyvinylidene chloride, polyvinyl alcohol or polyvinyl esters of organic acids, for example polyvinyl acetate, and finally those from regenerated cellulose, including spun rayon. The new bis-oxazoles can also be used for brightening natural fibers, for example cotton or wool fibers.

If the optical brightening according to this invention is to be applied to fibers—which may be staple fibers or monofils, in the crude state, in the form of hanks or woven fabrics—this is advantageously achieved in an aqueous medium in which the brightening substance is suspended. If required or desired, the treatment may be performed in the presence of a dispersant, for example soaps, polyglycol ethers of fatty alcohols, fatty amines or alkylphenols, cellulose sulfite waste liquor or formaldehyde condensation products of (optionally alkylated) naphthalene-sulfonic acids. Particularly good results have been obtained by working in a neutral, weakly alkaline or acid bath. It is likewise advantageous to perform the treatment at an elevated temperature ranging from about 50° to 100° C., for example at the boiling temperature of the bath or in its neighbourhood (about 90° C.). The improving treatment of this invention may also be performed with solutions in organic solvents.

The new bis-oxazoles to be used according to this invention may also be added to or incorporated with the materials before or during their shaping. Thus, in the manufacture of films, foils, tapes or mouldings they may be added to the moulding composition or dissolved or finely dispersed in the spinning composition before spinning it. The new brighteners may also be added to the reaction mixtures before or during the polycondensation leading, for example, to polyamides or especially polyesters, or before or during the polymerization of monomers, for example vinyl acetate or styrene, to the polymer masses.

The new bis-oxazoles are distinguished by their particularly good thermostability, fastness to light and to migration.

The amount of new bis-oxazole to be used according to this invention, referred to the weight of the material to be optically brightened, may vary within wide limits. Even a very small amount—in certain cases, for example, as little as 0.005%—may suffice to produce a distinct and lasting effect, though an amount of up to about 0.5% or even more may be used just as well.

The new bis-oxazoles to be used as brighteners may also be used in the following ways:

(a) In admixture with dyestuffs or pigments or as additives to dyebaths, printing inks, discharge or reserve pastes. Furthermore, also for after-treating dyeings, prints or discharge prints.

(b) In admixture with so-called "carriers," antioxidants, light filters, heat stabilizers, chemical bleaches or as additives to bleaching baths.

(c) In admixture with dressing agents, such as starches or synthetic dressing agents. The products of this invention may also be used with advantage for producing a crease-resisting finish by being added to liquors used for this purpose.

(d) In combination with detergents. The detergent and the brightener may be added separately to the washing liquor. It may also be of advantage to use a detergent that as such already contains a proportion of brightener. Suitable detergents are, for example, soaps, salts of sulfonate detergents, for example of sulfonated benzimidazoles substituted on the carbon atom 2 by higher alkyl radicals; also salts of monocarboxylic acid esters of 4-sulfatophthalic acid with higher fatty alcohols; furthermore salts of fatty alcohols; furthermore salts of fatty alcohol sulfonates, alkylarylsulfonic acids or condensation products of higher fatty acids with aliphatic hydroxysulfonic or aminosulfonic acids. Likewise suitable are non-ionic detergents, for example polyglycol ethers derived from ethylene oxide and higher fatty alcohols, alkylphenols or fatty amines.

If the present process is combined with other treating or improving operations, the combined treatment is advantageously performed with the aid of a suitable preparation. These stable preparations contain compounds of the above Formula 1 as well as dispersants, detergents, carriers, dyestuffs, pigments or dressing agents.

The compounds of the above Formula 1 may also be fixed on a finely dispersed support and used in this form. They are also suitable for use as scintillators, for various photographic purposes, such as for electrophotographic reproduction, or for supersensitizing.

Unless otherwise indicated, parts and percentages in the following examples are by weight.

Example 1

3.59 parts of the compound of the formula

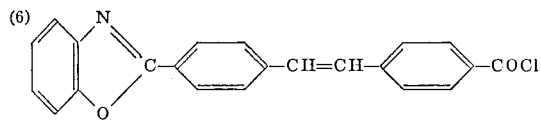

and 1.67 parts of 1-hydroxy-2-amino-5-carbomethoxybenzene in 60 parts by volume of dichlorobenzene are stirred under reflux with exclusion of air and moisture. 20 parts by volume of dibutylphthalate are then added and the mixture is heated to 330° C. while distilling off dichlorobenzene and the water of reaction. After cooling to room temperature (about 20° C.), suctioning, washing with ethanol and drying, there are obtained 4.0 parts of the compound of the formula

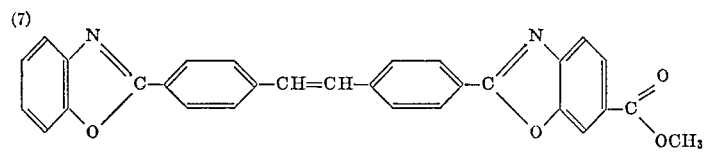

Yellow, crystalline precipitate from dichlorobenzene, melting above 305° C.

$C_{30}H_{20}O_4N_2$: Calculated C, 76.26%; H, 4.27%; N, 5.93%. Found C, 76.20%; H, 4.39%; N, 6.04%.

In analogous manner the compounds of the following formulae are obtained:

(8)
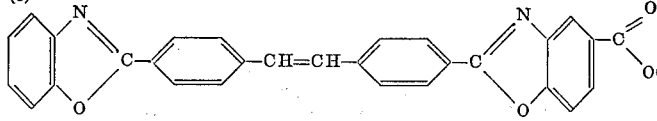

Small, light-yellow needles, from dioxane, melting above 310° C.

$C_{37}H_{34}O_4N_2$: Calculated C, 77.87%; H, 6.01%; N, 4.91%. Found C, 78.04%; H, 6.09%; N, 5.25%.

(9)
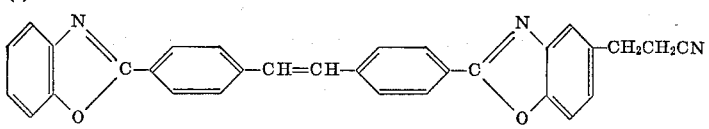

Small, yellow needles from chlorobenzene, melting above 340° C.

$C_{31}H_{21}O_2N_3$: Calculated C, 79.64%; H, 4.53%; N, 8.99%. Found C, 79.39%; H, 4.66%; N, 9.01%.

The acid chloride used as starting materials is manufactured in the following manner:

A solution of 324 parts of stilbene-4,4'-dicarboxylic acid diethyl ester in a mixture of 1000 parts by volume of ethanol and 4000 parts by volume of dioxane is mixed at 40° C. with 100 parts by volume of 10 N-sodium hydroxide solution. After stirring for one hour at 40° C., the resulting thick, cream-colored paste is cooled to room temperature (about 20° C.), suctioned, washed with dioxane and thoroughly expressed. The moist filter cake is stirred for 2 hours in 10,000 parts by volume of 5% hydrochloric acid, suctioned and washed with water until the washings run neutral. The crude suction filter cake is stirred for 60 minutes in 2000 parts by volume of N-aqueous triethanolamine solution, and the undissolved matter is filtered off. The filtrate is acidified with concentrated hydrochloric acid, the precipitate formed is suctioned off, washed neutral and dried, to yield about 231 parts of the monocarboxylic acid of the formula

(10)
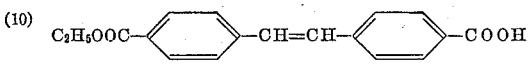

as a colorless powder whose melting point depends substantially on the heating speed (230° to 300° C.).

$C_{18}H_{16}O_4$: Calculated C, 72.96%; H, 5.44%; N, 21.60%. Found C, 72.75%; H, 5.40%; N, 21.34%.

When the above acid is boiled for 3 hours in excess thionylchloride, it gives a 97% yield of the acid chloride of the formula

(11)
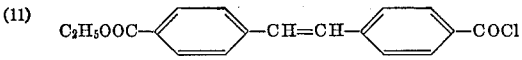

which from tetrachlorethylene forms colorless crystals melting at 134° to 136° C.

$C_{18}H_{15}O_3Cl$: Calculated C, 68.68%; H, 4.80%; N, 11.26%. Found 68.28%; H, 4.83%; N, 11.54%.

31.4 parts of the acid chloride (11) and 11.0 parts of 1-hydroxy-2-aminobenzene in 500 parts by volume of anhydrous ortho-dichlorobenzene are stirred at 15 hours at 136° C.; the dark solution is then mixed with 1 part of boric acid, heated to 180° C. while distilling off 300 parts by volume of water, and further stirred at this temperature for 2 hours.

After cooling, suctioning, washing with methanol and drying, there are obtained about 24.2 parts of the compound of the formula

(12)
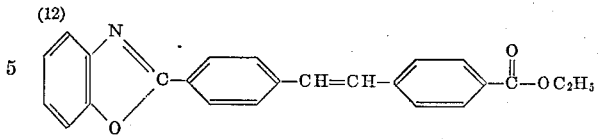

as a light-brown powder melting at 210° to 220° C. Recrystallization from tetrachlorethylene with the aid of bleaching earth furnishes a yellow, crystalline powder which melts at 227° to 229° C. and reveals the following analytical data:

$C_{24}H_{19}O_3N$: Calculated C, 78.03%; H, 5.18%; N, 3.79%. Found C, 78.33%; H, 5.27%; N, 3.75%.

39.6 parts of the ethyl ester (12) in 300 parts by volume of dioxane are hydrolyzed with 20 parts by volume of 10 N-sodium hydroxide solution for 4/12 hours at 85° to 90° C.; the batch is then mixed with 100 parts by volume of methanol, then cooled to room temperature (about 20° C.), suctioned and washed with methanol. The moist suction filter cake is taken up in 1000 parts by volume of dimethylformamide, mixed at 100° C. with 40 parts by volume of concentrated hydrochloric acid, cooled, suctioned, washed and dried, to yield about 32.2 parts of the compound of the formula

(13)
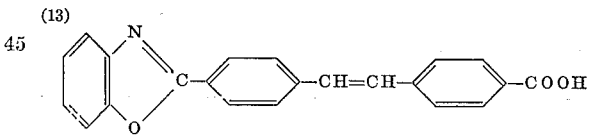

as a light-yellow powder melting at 318° to 320° C. On sublimation in a high vacuum at 285° C., light-yellow crystals of identical melting point are obtained.

$C_{22}H_{15}O_3N$: Calculated C, 77.40%; H, 4.43%; N, 4.10%. Found C, 77.30%; H, 4.60%; N, 4.18%. (Occasionally, the acid is obtained in a form that melts at 349° to 350° C.).

The oxazolecarboxylic acid (13) is converted in the known manner in a yield of about 87% into the acid chloride of the formula

(14)
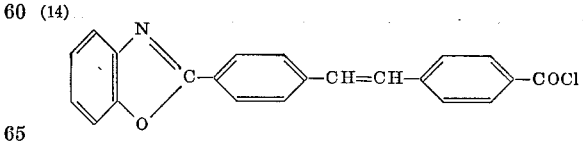

by boiling in an excess of thionylchloride in the presence of a catalytic amount of pyridine. Yellow crystals from orthodichlorobenzene, melting at 266° to 268° C.

$C_{22}H_{14}O_2NCl$: Calculated C, 73.44%; H, 3.92%; N, 3.89%. Found C, 73.42%; H, 4.04%; N, 3.86%.

Example 2

305 parts of powdered stilbene-4,4'-dicarboxylic acid chloride and 334 parts of 3-amino-4-hydroxybenzoic acid methyl ester are suspended in 2500 parts by volume of anhydrous dichlorobenzene. After having displaced the atmospheric oxygen from the apparatus by filling it with nitrogen, the batch is heated within about one hour to the reflux temperature while stirring it well. At 145° to 150° C. a strong evolution of hydrochloric acid sets in and is complete after refluxing for 4 hours. The whole is refluxed for 6 to 7 hours and then allowed to cool.

as a yellow, crystalline powder melting above 280° C.

$C_{32}H_{22}N_2O_6$: Calculated C, 72.44%; H, 4.18%; N, 5.28%. Found C, 72.35%; H, 4.12%; N, 5.26%.

When 3-amino-4-hydroxybenzoic acid methyl ester is replaced by 3-amino-4-hydroxybenzoic acid ethyl ester and the condensation is performed in identical manner, there is obtained the compound of the formula

(17)
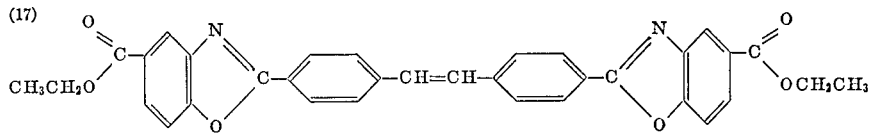

The reaction product at this stage forms a thick, yellowish paste which is suctioned at room temperature, thoroughly expressed and rinsed with a small amount of methanol. To remove the dichlorobenzene the filter residue is suspended in 5000 parts by volume of methanol and heated at the boil for a short time, then suctioned at room temperature and rinsed with methanol. After drying, there are obtained about 533 parts of the compound of the formula in approximately equal yield and purity from dichlorobenzene as a yellow, crystalline powder melting above 275° C.

$C_{34}H_{26}N_2O_6$: Calculated C, 73.11%; H, 4.69%; N, 5.02%. Found C, 72.9%; H, 4.70%; N, 5.04%.

When the condensation referred to above is carried out

(15)
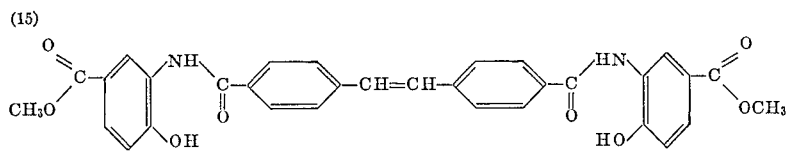

as a yellow-beige colored powder melting at 325° to 327° C. with decomposition.

with 3-amino-4-hydroxybenzoic acid isopropyl ester, the compound of the formula

(18)
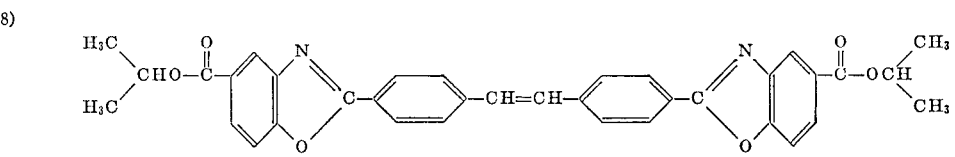

500 parts of the above compound of the Formula 15 are stirred in 2000 parts by volume of phthalic acid dibutyl ester. The reaction mixture is then heated under nitrogen within 10 minutes at 310° C., during which water escapes and a dark solution forms which is stirred for about 5 minutes at 310° C. and then allowed to cool. At 100° C. 2000 parts by volume of methanol are run is obtained from dichlorobenzene as a yellow, crystalline powder melting above 270° C.

$C_{36}H_{20}N_2O_6$: Calculated C, 73.70%; H, 5.15%; N, 4.78%. Found C, 73.64%; H, 5.29%; N, 4.90%.

When the condensation referred to above is performed with 3-amino-4-hydroxybenzoic acid butyl ester, the compound of the formula

(19)
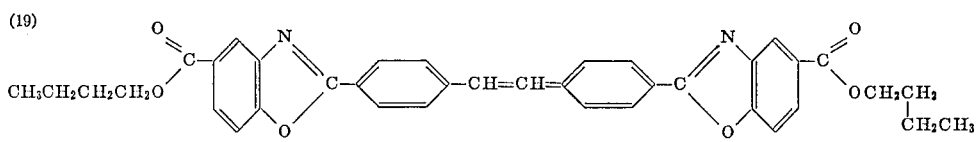

into the thickly liquid suspension; it is suctioned at room temperature and rinsed with methanol. The filter residue is then boiled for a short time with 5000 parts by volume of methanol, once more suctioned at room temperature and thoroughly rinsed with methanol and dried, to yield about 466 parts of a greenish yellow powder. After crystallization from dichlorobenzene with the use of bleaching earth it yields the compound of the formula is obtained from dioxane as a yellow, crystalline powder melting above 250° C.

$C_{38}H_{34}N_2O_6$: Calculated C, 74.25%; H, 5.58%; N, 4.56%. Found C, 73.98%; H, 5.55%; N, 4.78%.

When the condensation referred to above is performed with 3-amino-4-hydroxybenzoic acid-(2'-ethyl)-hexyl ester, the compound of the formula

(20)
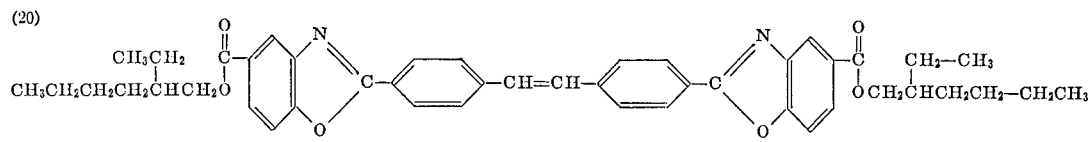

is obtained from dioxane as pale-yellow flakes melting above 240° C.

(16)
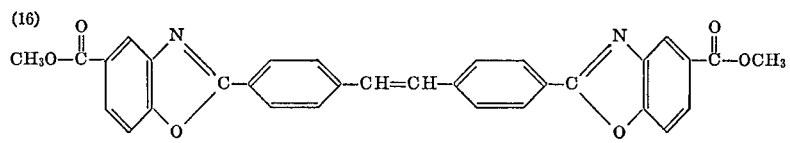

$C_{46}H_{50}N_2O_6$: Calculated C, 76.00%; H, 6.93%; N, 3.85%. Found C, 76.27%; H, 6.85%; N, 4.03%.

When the condensation referred to above is performed with 3-amino-4-hydroxybenzoic acid n-octadecyl ester, the product of the formula

(21)
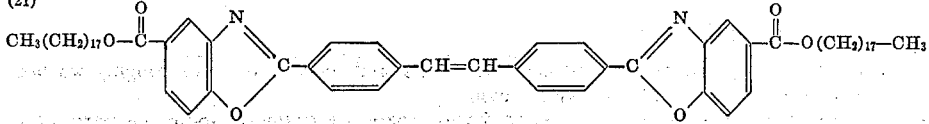

is obtained from toluene as a light-yellow powder melting above 240° C.

$C_{66}H_{90}O_6N_2$: Calculated C, 78.69%; H, 9.00%; N, 2.78%. Found C, 78.87%; H, 8.91%; N, 2.63%.

When the condensation is performed with 3-amino-4-hydroxybenzoic acid allyl ester, the compound of the formula

(22)
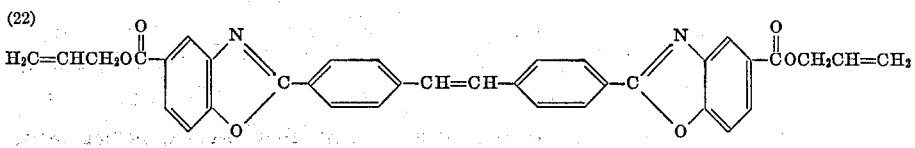

is obtained from dimethylformamide as a light-yellow powder melting above 270° C.

$C_{36}H_{26}O_6N_2$: Calculated C, 74.21%; H, 4.50%; N, 4.81%. Found C, 73.96%; H, 4.66%, N, 4.85%.

When the condensation is performed with 4-amino-3-hydroxybenzoic acid methyl ester, the compound of the formula

(23)
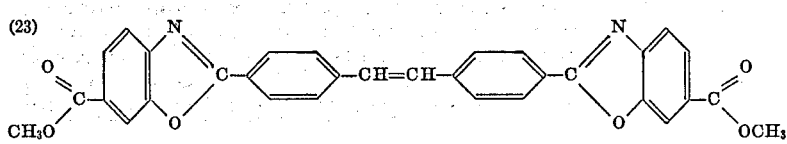

is obtained from dichlorobenzene in the form of small, lemon-colored needles, melting above 320° C.

$C_{32}H_{22}O_6N_2$: Calculated C, 72.44%; H, 4.18%; N, 5.28%. Found C, 72.20%; H, 4.21%; N, 5.30%.

When the condensation is performed with 4-amino-3-hydroxybenzoic acid ethyl ester, the compound of the formula

(24)
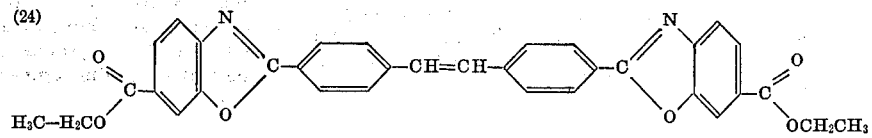

is obtained from dichlorobenzene in the form of small, lemon-colored needles melting above 340° C.

$C_{34}H_{26}O_6N_2$: Calculated C, 73.11%; H, 4.69%; N, 5.02%. Found C, 72.97%; H, 4.79%; N, 5.11%.

When the condensation is performed with 3-amino-4-hydroxybenzoic acid-(2'-methoxy)-ethyl ester, the compound of the formula

(25)
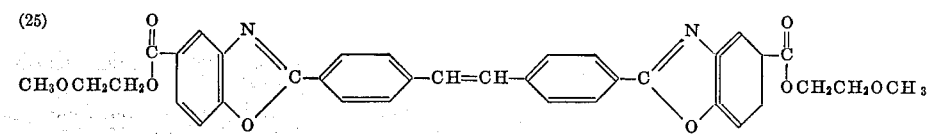

is obtained from xylene as a yellow powder melting above 320° C.

$C_{36}H_{30}N_2O_8$: Calculated C, 69.89%; H, 4.89%; N, 4.53%. Found C, 70.03%; H, 4.88%; N, 4.62%.

When the condensation is performed with 3-amino-4-hydroxy-5-methoxybenzoic acid methyl ester, the compound of the formula

(26)
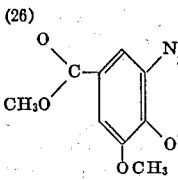

is obtained from dichlorobenzene as a pale-yellow, granular precipitate melting above 350° C.

$C_{34}H_{26}N_2O_8$: Calculated C, 69.14%; H, 4.44%; N, 4.74%. Found C, 68.82%; H, 4.45%; N, 4.98%.

Example 3

A solution of 54 parts of sodium hydroxide in 150 parts by volume of water is added to a fine suspension of 77.4 parts of the compound of the Formula 16 in 1200 parts by volume of ethyleneglycol monomethyl ether. The batch is then refluxed for 30 hours; the dark-yellow disodium salt of the formula

(27)
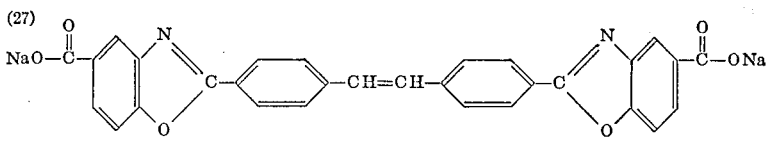

is suctioned off at room temperature (about 20° C.) and rinsed thoroughly with methyl Cellosolve. To free the residue from any residual starting material it is extracted with 2000 parts by volume of boiling ortho-dichlorobenzene. After drying, there are obtained about 96 parts of a dark-yellow, granular powder which does not melt up to 350° C.

The finely powdered disodium salt of the Formula 27 is then suspended in 3000 parts by volume of boiling water, dilute hydrochloric acid is added to establish a strongly acidic reaction to Congo red and the whole is refluxed for 1 hour and then allowed to cool, suctioned at room temperature and washed with water until the washings run neutral and dried. Yield: about 68.4 parts of the dicarboxylic acid of the formula

(28)
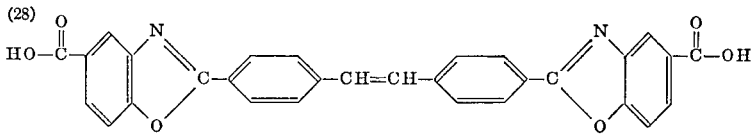

as a dark-yellow powder which does not melt up to 350° C. The compound is recrystallized from dimethylsulfoxide.

Example 4

A suspension of 119.2 parts of the dicarboxylic acid of the Formula 28 in 1500 parts by volume of chlorobenzene is mixed with 150 parts by volume of thionylchloride and 5 parts by volume of dimethylformamide and the mixture is heated for 48 hours at 90° to 95° C., whereupon the evolution of hydrochloric acid ceases. The batch is suctioned at room temperature (about 20° C.) and rinsed with anhydrous chlorobenzene and petroleum ether. After drying there are obtained about 118.6 parts of a yellow powder which melts at 330° C. with decomposition.

Crystallization from chlorobenzene furnishes the dicarboxylic acid chloride of the formula

(29)
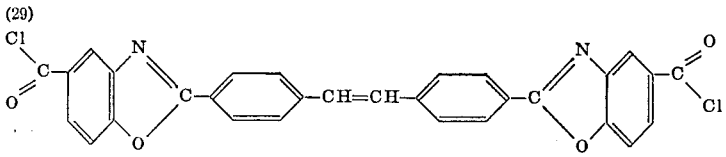

in the form of small yellow needles which melt at 350° C. with decomposition.

5.1 parts of the dicarboxylic acid chloride of the Formula 29 are stirred with 2.5 parts of benzyl alcohol in 100 parts by volume of anhydrous chlorobenzene, mixed with 5 parts of pyridine, the whole is heated to reflux and maintained at this temperature for 4 hours, then allowed to cool, suctioned, and the residue is thoroughly washed with acetone.

After drying, there are obtained about 5.8 parts of a greenish yellow powder which melts above 315° C.

Crystallization from chlorobenzene furnishes the compound of the formula

(30)
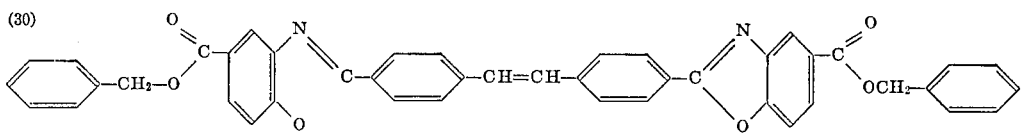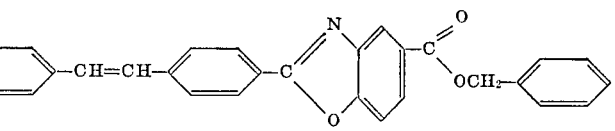

in the form of small, yellow needles which melt above 318° C.

$C_{44}H_{30}O_6N_2$: Calculated C, 77.40%; H, 4.43%; N, 4.10%. Found C, 77.18%; H, 4.61%; N, 4.27%.

An analogous reaction of the dicarboxylic acid chloride of the Formula 29 with 4-(1′,1′,3′,3′-tetra-methyl-butyl)-phenol yields the compound of the Formula 31

(31)
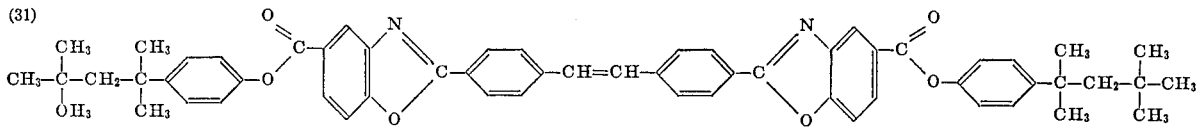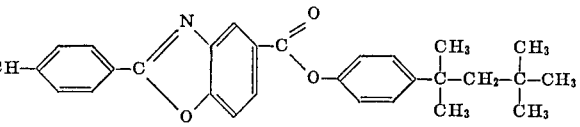

in the form of small, light-yellow needles, melting above 340° C., from dichlorobenzene.

$C_{58}H_{58}O_6N_2$: Calculated C, 79.24%; H, 6.65%; N, 3.19%. Found C, 78.84%; H, 6.68%; N, 3.29%.

Example 5

290 parts of powdered stilbene-4,4′-dicarboxylic acid chloride and 370 parts of 3-amino-4-hydroxyphenyl-propionic acid methyl ester are stirred in 7500 parts by volume of anhydrous xylene at room temperature (about 18° C.). The atmospheric oxygen is displaced from the apparatus with nitrogen and the reaction mixture is heated within about one hour to reflux temperature while stirring it well, whereupon a strong evolution of hydrochloric acid sets in. After refluxing for 15 hours the evolution of hydrochloric acid ceases substantially and the reaction product forms a thick, yellow paste which is suctioned at room temperature and rinsed with xylene. The residue is then boiled with 5000 parts by volume of methanol, and dried, to yield about 577 parts of the compound of the formula (32)

$$\text{CH}_3\text{O-C(=O)-CCH}_2\text{CH}_2\text{-[benzene-OH]-NH-C(=O)-[C}_6\text{H}_4\text{]-CH=CH-[C}_6\text{H}_4\text{]-C(=O)-NH-[benzene-OH]-CH}_2\text{CH}_2\text{-C(=O)-OCH}_3$$

as a yellow powder which melts at 317° C. with decomposition.

560 parts of the compound of the Formula 32 are (33)

$$\text{CH}_3\text{O-C(=O)-CCH}_2\text{CH}_2\text{-[benzoxazole]-C-[C}_6\text{H}_4\text{]-CH=CH-[C}_6\text{H}_4\text{]-C-[benzoxazole]-CH}_2\text{CH}_2\text{-C(=O)-OCH}_3}$$

stirred in 2000 parts by volume of phthalic acid dibutyl ester, and the reaction mixture is then heated with a free flame under nitrogen within 10 minutes to 310° C., during which water escapes and a dark solution forms which is stirred for about 5 minutes at 310° to 320° C. and then allowed to cool. At 100° C. 2000 parts by volume of methanol are run into the thickly liquid suspension, which is then suctioned at room temperature and rinsed with methanol. The filter residue is extracted by being boiled with 5000 parts of methanol, suctioned and thoroughly rinsed with methanol and then crystallized from dimethylformamide, to yield about 302 parts of the compound of the formula in the form of yellow prisms melting above 190° C.

$C_{36}H_{30}N_2O_6$: Calculated C, 73.70; H, 5.15; N, 4.78%. Found C, 73.77; H, 5.25; N, 5.02%.

Example 6

147 parts of the compound of the Formula 33 are stirred in a solution of 80 parts of sodium hydroxide in 200 parts by volume of water and 1800 parts by volume (34)

$$\text{NaO-C(=O)-CH}_2\text{CH}_2\text{-[benzoxazole]-C-[C}_6\text{H}_4\text{]-CH=CH-[C}_6\text{H}_4\text{]-C-[benzoxazole]-CH}_2\text{CH}_2\text{-C(=O)-ONa}$$

of ethyleneglycol monomethyl ether for 1 hour at the reflux temperature, whereupon a thick suspension is formed which is suctioned at room temperature and rinsed with methanol. The residue is boiled with 2000 parts by volume of dimethylformamide, suctioned while still hot and rinsed with methanol and dried, to yield about 140 parts of the compound of the formula as a brilliant yellow powder which does not melt below 350° C.

30 parts of the disodium salt of the Formula 34 are dissolved in 750 parts by volume of hot water, active carbon is added, and the whole is filtered clear while still hot and then rendered acid to Congo red with hydrochloric acid, suctioned at room temperature and washed with water until the washings run neutral.

After two recrystallizations from dimethylformamide there are obtained about 14 parts of the compound of the formula (35)

$$\text{HO-C(=O)-CCH}_2\text{CH}_2\text{-[benzoxazole]-C-[C}_6\text{H}_4\text{]-CH=CH-[C}_6\text{H}_4\text{]-C-[benzoxazole]-CH}_2\text{CH}_2\text{-C(=O)-OH}$$

as a yellow powder melting above 310° C.

$C_{34}H_{26}N_2O_6$: Calculated C, 73.11; H, 4.69; N, 5.02%. Found C, 73.31; H, 4.85; N, 5.30%.

Example 7

204 parts of powdered stilbene-4,4'-dicarboxylic acid chloride and 216 parts of 3-amino-4-hydroxy-1-cyanoethyl-benzene are refluxed for 20 hours in 5000 parts by volume of anhydrous xylene. The thick suspension is then suctioned at room temperature, thoroughly rinsed with methanol and sucked dry. The residue is suspended in 1500 parts by volume of phthalic acid dibutyl ester and the reaction mixture is heated with a free flame under nitrogen to 310° C., whereupon water escapes and a dark solution forms which is stirred for about 5 minutes at 310° to 320° C. and then allowed to cool. At 100° C. 1000 parts of methanol are run into the thick suspension which is then suctioned at room temperature and thoroughly rinsed with methanol.

Crystallization from dimethylformamide furnishes about 130 parts of the compound of the formula (36)

$$\text{NCCH}_2\text{CH}_2\text{-[benzoxazole]-C-[C}_6\text{H}_4\text{]-CH=CH-[C}_6\text{H}_4\text{]-C-[benzoxazole]-CH}_2\text{CH}_2\text{CN}$$

in the form of yellow prisms. After further crystallization from dimethylformamide the compound melts above 320° C.

$C_{34}H_{24}N_4O_2$: Calculated C, 78.44%; H, 4.65%; N, 10.76%. Found C, 78.43%; H, 4.80%; N, 10.68%.

Example 8

10,000 parts of a polyamide in chip form, prepared in the known manner from hexamethylenediamine adipate, are mixed for 12 hours in a tumbler with 30 parts of titanium dioxide (rutil modification) and 2 parts of the compound of the Formula 18. The chips treated in this manner are then melted in a boiler, heated with oil or diphenyl vapour at 300° to 310° C. (after having displaced the atmospheric oxygen from it with superheated steam) and then stirred for half an hour. The melt is then expressed under a nitrogen pressure of 5 atmospheres (gauge) through a spinneret and the resulting filament is allowed to cool and wound up on a spinning cop. The resulting filaments display an excellent brightening effect which is stable to thermosetting and has good fastness to washing and light.

Example 9

100 parts of a polyester granulate from polyterephthalic acid ethyleneglycol ester are intimately mixed with 0.01 part of the compound of the Formula 18 and melted with stirring at 285° C. Spinning of this spinning composition through conventional spinnerets results in strongly brightened polyester fibers.

If desired, the compound of the Formula (18) may be added to the starting materials before or during the polycondensation leading to the polyester.

Example 10

Polyvinyl chloride fibers (registered trade mark Thermovyl) are treated for one hour at 80° to 90° C., at a goods-to-liquor ratio of 1:40, with 0.02% of the compound of the Formula 17 in a bath containing per liter 2 g. of an adduct from about 35 mols of ethylene oxide with 1 mol of octadecyl alcohol (dispersant). The fibers are then rinsed and dried.

The polyvinyl chloride fibers treated in this manner possess a substantially higher white content than the untreated fiber.

Example 11

An intimate mixture of 100 parts of polyvinyl chloride, 3 parts of stabilizer (Advastat BD 100; Ba/Cd complex), 2 parts of titanium dioxide, 59 parts by volume of dioctylphthalate and 0.01 to 0.2 part of the compound of the Formula 23 is rolled on a calender at 150° to 155° C. to form a foil. The resulting opaque polyvinyl chloride foil has a substantially higher white content than a foil that does not contain the bis-oxazolyl-stilbene compound.

Example 12

10,000 parts of a polyamide in chip form, prepared in the known manner from ε-caprolactam, are mixed with 30 parts of titanium dioxide (rutil modification) and 2 parts of the compound of the Formula 18 for 12 hours in a tumbler. The chips treated in this manner are melted in a boiler from which the atmospheric oxygen has been displaced and which is heated at 270 C., and the melt is then stirred for half an hour, then expressed under a nitrogen pressure of 5 atmospheres (gauge) through a spinneret, allowed to cool and wound up on a spinning bobbin. The filaments obtained in this manner possess an excellent brightening effect which is stable to thermosetting and has good fastness to washing and light.

What is claimed is:

1. A bis-benzoxazolyl-stilbene of the formula

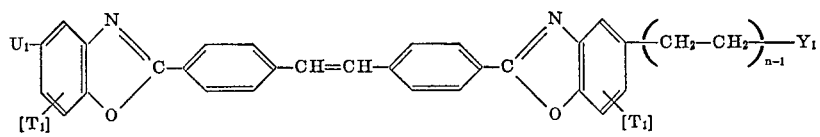

wherein
$U_1$ represents a member selected from the group consisting of hydrogen and

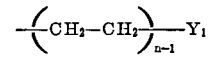

$n$ stands for the number 1 or 2
$Y_1$ is a member selected from the group consisting of carboxyl, carbo($C_1$–$C_{18}$)alkoxy, carbo($C_2$–$C_3$)-alkenyloxy, —COO-($C_1$–$C_4$)-alkylene-O-($C_1$–$C_2$)-alkyl, carbophenyl($C_1$–$C_4$)-alkoxy, carbo($C_1$–$C_8$)-alkylphenoxy and a nitrile group.

2. A bis-benzoxazolyl-stilbene as claimed in claim 1 of the formula

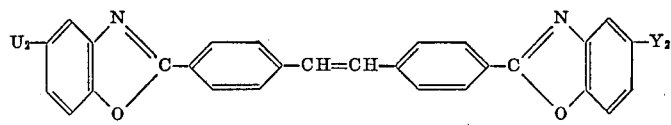

wherein $U_2$ represents a member selected from the group consisting of hydrogen and $Y_2$, and $Y_2$ is a member selected from the group consisting of a carboxyl group, a carbalkoxy group having 1 to 18 carbon atoms in the alkoxy group, a carboxylic acid allyl ester group and a —COO-($C_1$–$C_4$)-alkylene-O-alkyl-($C_1$–$C_2$) group.

3. A bis-benzoxazolyl-stilbene according to claim 1 of the formula

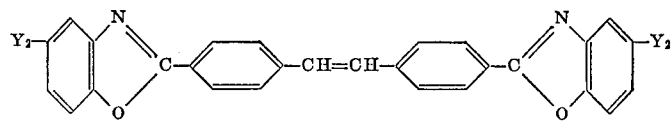

wherein $Y_2$ is a member selected from the group consisting of a carboxyl group, a carbalkoxy group having from 1 to 6 carbon atoms in the alkoxy group a carboxylic acid allyl ester group and a —COO-($C_1$–$C_4$)alkylene-O-alkyl ($C_1$–$C_2$) group.

4. The compound according to claim 1 of the formula

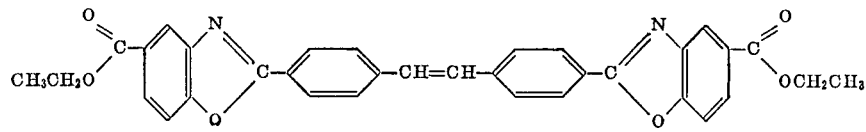

5. The compound according to claim 1 of the formula

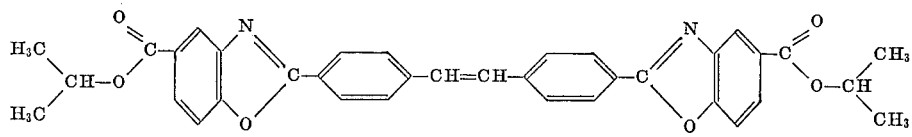

6. The compound according to claim 1 of the formula

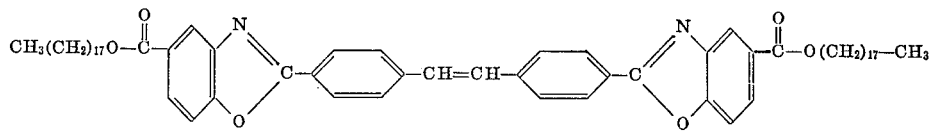

7. The compound according to claim 1 of the formula

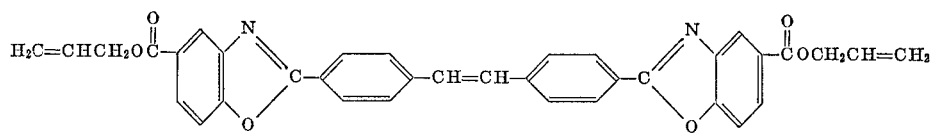

8. The compound according to claim 1 of the formula

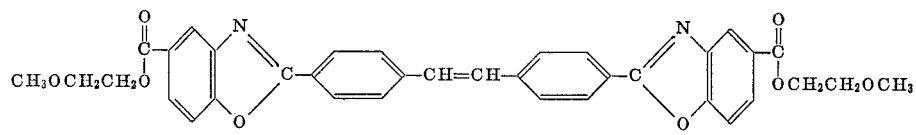

9. The compound according to claim 1 of the formula

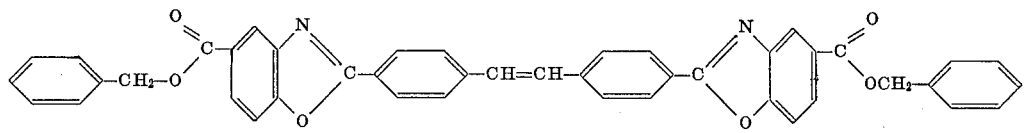

10. The compound according to claim 1 of the formula

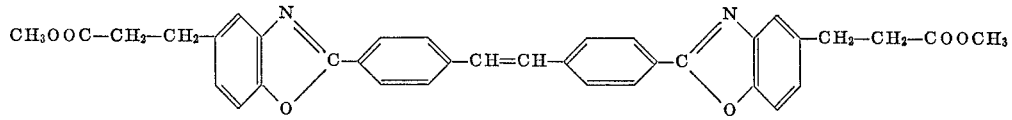

11. The compound according to claim 1 of the formula

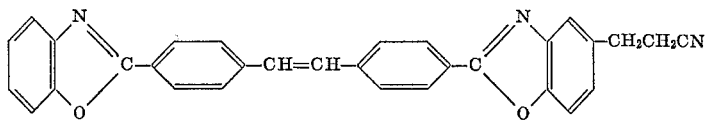

12. The compound according to claim 1 of the formula

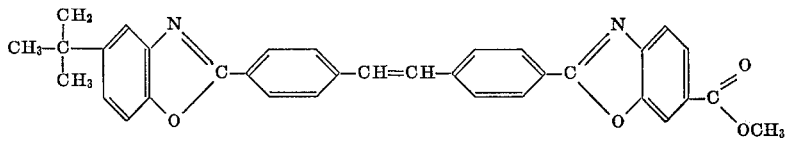

References Cited

UNITED STATES PATENTS 3,260,715   7/1966   Saunders _____ 260—240

JOHN D. RANDOLPH, *Primary Examiner.*

UNITED STATES PATENT OFFICE
CERTIFICATE OF CORRECTION

Patent No. 3,407,196                              October 22, 1968

Peter Liechti et al.

It is certified that error appears in the above identified patent and that said Letters Patent are hereby corrected as shown below:

Column 17, the left-hand portion of the formula in claim 12 should appear as shown below:

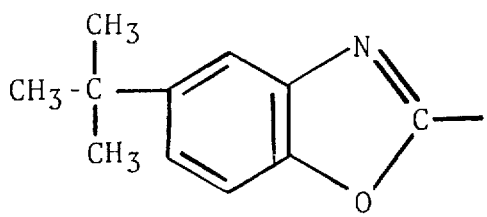

Signed and sealed this 10th day of March 1970.

(SEAL)
Attest:

EDWARD M. FLETCHER, JR.                WILLIAM E. SCHUYLER, JR.
Attesting Officer                         Commissioner of Patents